United States Patent
Chung et al.

(10) Patent No.: US 7,257,324 B2
(45) Date of Patent: Aug. 14, 2007

(54) APPARATUS FOR MONITORING OPTICAL SIGNAL-TO-NOISE RATIO

(75) Inventors: Yun Chur Chung, Daejeon (KR);
Chun Ju Youn, Gyeonggi-do (KR);
Keun Joo Park, Jeollanam-do (KR);
Jun Haeng Lee, Gyeonggi-do (KR)

(73) Assignee: Korea Advanced Institue of Science and Technology, Yuseong-gu (KR)

( * ) Notice: Subject to any disclaimer, the term of this patent is extended or adjusted under 35 U.S.C. 154(b) by 709 days.

(21) Appl. No.: 10/724,072

(22) Filed: Dec. 1, 2003

(65) Prior Publication Data

US 2004/0126108 A1    Jul. 1, 2004

(30) Foreign Application Priority Data

Dec. 17, 2002    (KR) .................. 10-2002-0080851

(51) Int. Cl.
*H04B 10/08* (2006.01)
*H04B 10/00* (2006.01)
(52) U.S. Cl. .................................. 398/26; 398/152
(58) Field of Classification Search ............ 398/26, 398/152, 33, 158
See application file for complete search history.

(56) References Cited

U.S. PATENT DOCUMENTS

| 5,986,782 A | 11/1999 | Alexander et al. .......... 359/110 |
| 6,433,864 B1 | 8/2002 | Chung et al. .............. 356/73.1 |
| 6,813,021 B2 * | 11/2004 | Chung et al. ................ 356/364 |

* cited by examiner

*Primary Examiner*—M. R. Sedighian
(74) *Attorney, Agent, or Firm*—Oliff & Berridge, PLC

(57) ABSTRACT

Disclosed is an apparatus for monitoring an optical signal-to-noise ratio in a WDM optical network. The apparatus includes an orthogonal polarization component module for receiving an optical signal and outputting it after removing a signal component thereof at a specific frequency band; and calculation means for measuring both average signal and noise component intensity of the optical signal outputted from the orthogonal polarization component module. By removing a signal component at a specific frequency bandwidth and passing only a noise component through, it is possible to easily measure the noise intensity within a signal bandwidth that cannot be measured in general. A frequency band is set within a signal bandwidth, and the signal intensity is minimized at the set frequency band, so that it is possible to measure the optical signal-to-noise ratio even for a signal whose amplified spontaneous emission noise spectrum is not flat, irrespective of the signal pattern length.

8 Claims, 9 Drawing Sheets

APPARATUS FOR MONITORING OPTICAL SIGNAL-TO-NOISE RATIO

BACKGROUND OF THE INVENTION

1. Field of the Invention

The present invention relates to an apparatus for monitoring an optical signal-to-noise ratio, and more particularly to an apparatus for monitoring an optical signal-to-noise ratio in a WDM (Wavelength Division Multiplexing) optical network, using orthogonal polarization components of an optical signal.

2. Description of the Related Art

WDM technology is employed to transmit a number of independent optical channels, separated from each other, through a single optical fiber.

Although it provides relatively low transmission rates, use of the WDM scheme enables a significant increase in the transmission capacity per optical fiber, which is thus effective in achieving a broadband high-speed communication network.

In the WDM scheme, an optical amplifier for amplifying an optical signal is essential in compensating for loss in an optical fiber and increasing the transmission distance. However, the optical amplifier decreases the performance of an optical signal, because it reduces the optical signal-to-noise ratio due to amplified spontaneous emission noise occurring when the optical signal passes through the optical amplifier. Accordingly, if the optical signal-to-noise ratio directly related to the performance of the optical signal is measured, it is possible to measure the performance of the WDM system. If correct information of the performance of the WDM system is known, it is possible to operate, maintain and manage the WDM system more effectively.

FIG. 1 is a graph showing an optical spectrum after an optical signal passes through a number of optical add/drop multiplexers or optical cross-connects in a WDM optical network.

It can be seen from FIG. 1 that each channel has a different optical signal-to-noise ratio, and the spectrum of amplified spontaneous emission noise is not flat since the optical signal passes through a number of optical add/drop multiplexers or optical cross-connects.

In the prior art, an optical spectrum analyzer employing a rotating diffraction grating is used to measure the optical signal-to-noise ratio. The optical spectrum analyzer is advantageous in that it has a wide measurement range and a high accuracy, but disadvantageous in that it is expensive and has a large size.

Some optical SNR (signal-to-noise ratio) measurement methods have been proposed to make up for such a disadvantage of the optical spectrum analyzer.

One example of such optical SNR measurement methods employs an acousto-optic tunable filter. This method has a wide measurement range and a high-speed property, but has a low resolution, so it cannot be used when the channel spacing of WDM signals is narrow.

Another example uses an arrayed waveguide diffraction grating. This method infers the optical signal-to-noise ratio by measuring amplified spontaneous emission noise through a specific port other than signal measurement ports among output ports of the arrayed waveguide diffraction grating. However, this method employing an arrayed waveguide diffraction grating also has the same disadvantage as the former methods employing an optical spectrum analyzer or an acousto-optic tunable filter in that it can be used only when the amplified spontaneous emission noise spectrum is flat.

In other words, the prior arts employing the optical spectrum analyzer, the acousto-optic tunable filter or the arrayed waveguide diffraction grating, have a problem in that it is difficult to correctly measure the amount of amplified spontaneous emission noise of each WDM channel when the spontaneous emission noise spectrum is not flat.

A method has been proposed in recent, which can measure the optical signal-to-noise ratio in a WDM optical network while overcoming such a problem. In order to measure the optical signal-to-noise ratio for each channel, this method uses low frequency electrical noise occurring when detecting each optical channel. However, in order to perform the noise measurement, this method requires the PRBS(pseudo random bit sequences) length of a signal to be less than $2^{15}-1$ bits. Accordingly, for signals such as real random data having a pattern length more than $2^{15}-1$ bits, this method cannot measure low frequency noise due to the signal component larger than noise component. Thus, there is a need to provide a method that can measure the optical signal-to-noise ratio even for a signal whose amplified spontaneous emission noise spectrum is not flat, irrespective of the signal pattern length.

SUMMARY OF THE INVENTION

Therefore, the present invention has been made in view of the above problems, and it is an object of the present invention to provide an apparatus for monitoring an optical signal-to-noise ratio, which makes it possible to effectively operate, maintain and manage a WDM optical network by measuring the optical signal-to-noise ratio even for a signal whose amplified spontaneous emission noise spectrum is not flat, irrespective of the signal pattern length.

In accordance with the present invention, the above and other objects can be accomplished by the provision of an apparatus for monitoring an optical signal-to-noise ratio, comprising an orthogonal polarization component module for receiving an optical signal and outputting only a noise component after removing a signal component thereof at a specific electrical frequency band; and calculation means for measuring both average signal intensity and noise component intensity of the optical signal outputted from the orthogonal polarization component module.

Preferably, the orthogonal polarization component module includes a polarization controller for receiving the optical signal and outputting it while controlling first and second polarization components of the optical signal perpendicular to each other to have the same intensity; a polarization divider for receiving the optical signal outputted from the polarization controller, and dividing it into the first and second polarization components, and then outputting them; an optical delay element for receiving one of the first and second polarization components outputted from the polarization divider, and delaying and outputting the received polarization component; and a polarization combiner for receiving the two polarization components outputted from the polarization divider, one being delayed by the optical delay element and the other not delayed, and combining them into an optical signal and outputting the optical signal.

Preferably, the calculation means includes an optical divider for dividing the optical signal outputted from the orthogonal polarization component module into two optical signals in two different directions; average signal intensity measurement means for measuring a average signal intensity of one of the two optical signals outputted from the optical divider; noise intensity measurement means for measuring a noise intensity of the other one of the two optical signals outputted from the optical divider; and a calculator for calculating an optical signal-to-noise ratio based on both the measured average signal intensity and the measured noise intensity.

Preferably, the calculation means includes an optical detector for receiving the optical signal outputted from the orthogonal polarization component module and converting it into an electrical signal, and outputting the electrical signal; an electrical intensity divider for dividing the electrical signal outputted from the optical detector into two electrical signals to be outputted in two different directions; average signal intensity measurement means for receiving one of the two electrical signals outputted from the electrical intensity divider, and measuring an average signal intensity of the optical signal; noise intensity measurement means for receiving the other one of the two electrical signals outputted from the electrical intensity divider, and measuring a noise component intensity; and a calculator for calculating an optical signal-to-noise ratio based on both the measured average signal intensity and the measured noise component intensity.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments according to the present invention will be described in detail with reference to the figures. The figures and the preferred embodiments are provided for illustrative purposes, without limiting the scope of the present invention.

Figure 1:
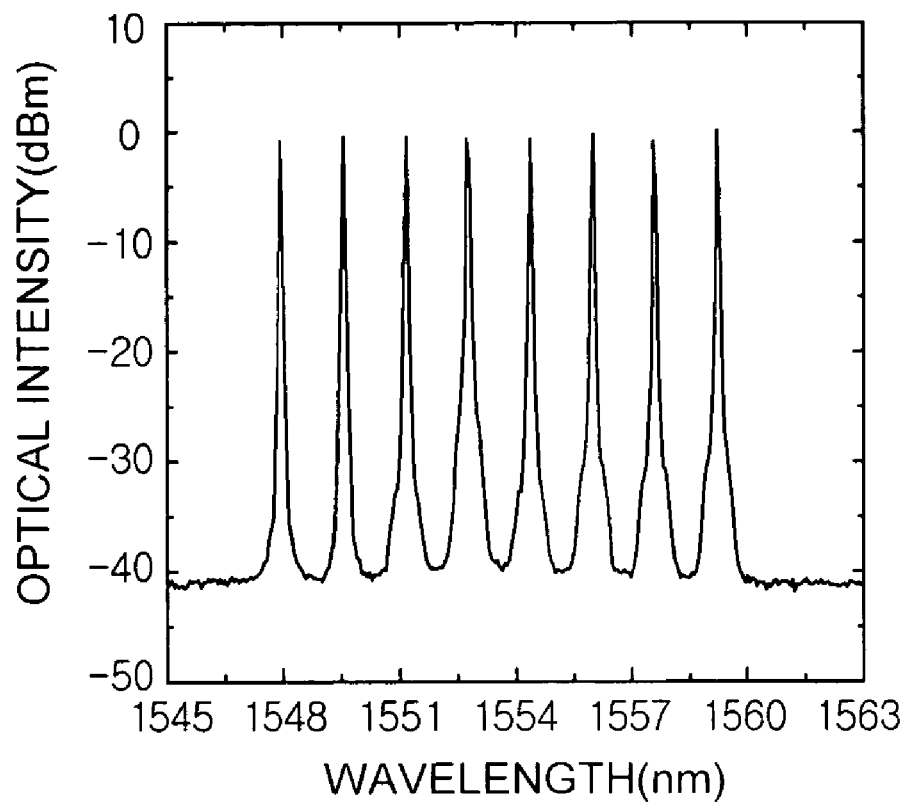
FIG. 1 is a graph showing an optical spectrum after an optical signal passes through a number of optical add/drop multiplexers or optical cross-connects in a WDM optical network.
Figure 2:
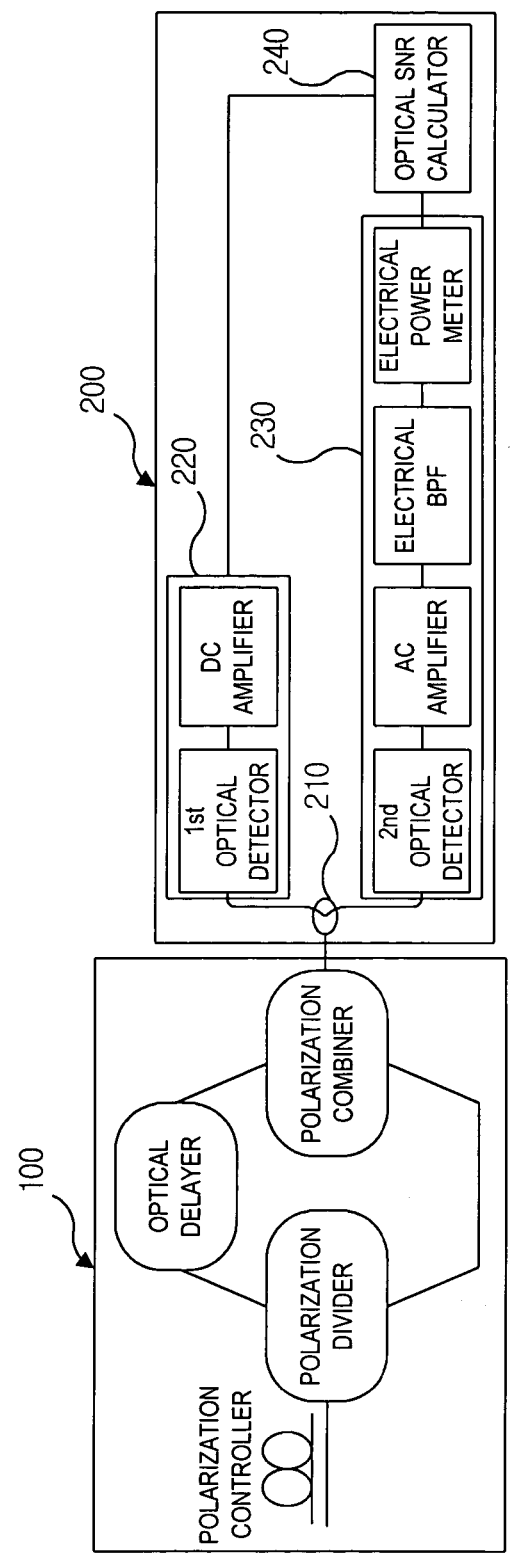
FIGS. 2 and 3 illustrate the configuration of an apparatus for monitoring an optical signal-to-noise ratio according to first and second embodiments of the present invention, respectively.

FIG. 2 illustrates the configuration of an apparatus for monitoring an optical signal-to-noise ratio according to a first embodiment of the present invention.

Embodiment 1

As shown in FIG. 2, the apparatus for monitoring the optical signal-to-noise ratio according to the first embodiment of the present invention includes an orthogonal polarization component module 100 and calculation means 200.

The orthogonal polarization component module 100 includes a polarization controller, a polarization divider, an optical delay element and a polarization combiner. The polarization controller receives an optical signal, and outputs it to the polarization divider while controlling first and second polarization components thereof perpendicular to each other to have the same intensity. The polarization divider receives the optical signal outputted from the polarization controller, and divides it into the first and second polarization components, and then outputs them. The optical delay element receives one of the first and second polarization components and delays and outputs the received one. The polarization combiner receives the two polarization components outputted from the polarization divider, one being delayed by the optical delay element and the other not delayed since it is not inputted to the optical delay element, and combines them into a single optical signal and outputs it.

If an optical signal is viewed in the electrical spectrum thereof, both the signal and noise components thereof exist at every frequency band. It is difficult to measure the amount of noise since the intensity of the signal component is much larger than that of the noise component. However, if the orthogonal polarization component module 100 is used to remove a signal component at a specific frequency band and output only a noise component, the calculation means 200 can measure the intensity of a average optical signal and the intensity of a noise component thereof, thereby calculating the optical signal-to-noise ratio. Said intensity of average optical signal corresponds to the intensity of a DC component of an electrical signal corresponding to the optical signal.

The calculation means 200 includes an optical divider 210, average signal intensity measurement means 220, noise intensity measurement means 230 and an optical SNR calculator 240.

The optical divider 210 receives the optical signal outputted from the polarization combiner and divides it into two optical signals in two different directions, and provides them to the average signal intensity measurement means 220 and the noise intensity measurement means 230, respectively.

The average signal intensity measurement means 220 employs an optical intensity detector that includes a first optical detector and a DC amplifier. The first optical detector receives one of the two optical signals divided by the optical divider 210 and converts it into a first electrical signal, and outputs it. The DC amplifier amplifies only a DC component of the first electrical signal outputted from the first optical detector. In this manner, the average signal intensity measurement means 220 measures and outputs only the intensity of the DC component of the electrical signal corresponding to the optical signal.

The noise intensity measurement means 230 includes a second optical detector, an AC amplifier, an electrical band pass filter and an electrical intensity meter. The second optical detector receives the other one of the two optical signals outputted from the optical divider 210, and converts it into a second electrical signal and outputs it. The AC amplifier receives the second electrical signal outputted from the second optical detector, and amplifies and outputs only an AC component, including noise, of the second electrical signal outputted from the second optical detector. The electrical band pass filter outputs only the noise component of the optical signal (based on the AC component amplified by the AC amplifier) since signal component is eliminated by orthogonal polarization component module. The electrical intensity meter measures the intensity of the noise outputted from the electrical band pass filter, and outputs the measured noise intensity.

The optical SNR calculator 240 receives both the measured intensity of average optical signal and the measured intensity of the noise component thereof, and calculates the optical signal-to-noise ratio.

Embodiment 2

Figure 3:
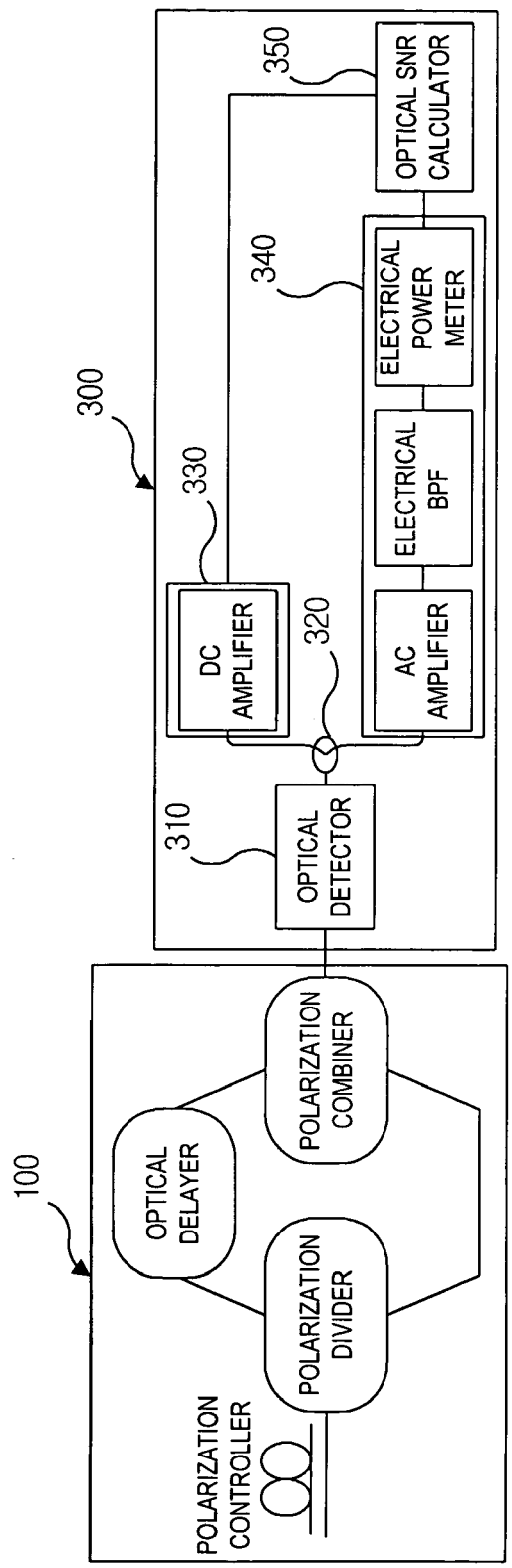

FIG. 3 illustrates the configuration of an apparatus for monitoring an optical signal-to-noise ratio according to a second embodiment of the present invention.

As shown in FIG. 3, the apparatus for monitoring the optical signal-to-noise ratio according to this embodiment includes an orthogonal polarization component module 100 and calculation means 300. The configuration and operation of the orthogonal polarization component module 100 in this embodiment is the same as that of the first embodiment, and a description thereof will thus be omitted in this embodiment.

The calculation means 300 includes an optical detector 310, an electrical intensity divider 320, average signal intensity measurement means 330, noise intensity measurement means 340 and an optical SNR calculator 350.

The optical detector 310 receives an optical signal outputted from the orthogonal polarization component module 100, and converts the received optical signal into an electrical signal and outputs it.

The electrical intensity divider 320 receives the electrical signal outputted from the optical detector 310, and divides it into two electrical signals to be outputted in two different directions.

Since both average and spectral intensity of the optical signal has been previously detected in the optical detector 310, the average signal intensity measurement means 330 includes only a DC amplifier 330, differently from the first embodiment. The DC amplifier receives one of the two electrical signals outputted from the electrical intensity divider 320, and amplifies a DC component of the received electrical signal, and then provides it to the optical SNR calculator 350. In this manner, the average signal intensity measurement means 330 measures and outputs only the intensity of the DC component of an electrical signal corresponding to the optical signal, as in the first embodiment.

The noise intensity measurement means 340 includes an AC amplifier, an electrical band pass filter, an electrical intensity meter and an optical SNR calculator. Since both average and spectral intensity of the optical signal has been previously detected in the optical detector 310, there is no need for the noise intensity measurement means 340 to include an optical detector, differently from the first embodiment.

As in the first embodiment, the optical SNR calculator 350 receives both the measured intensity of the signal component of the optical signal and the measured intensity of the noise component thereof, and calculates the optical signal-to-noise ratio.

When the apparatus for monitoring an optical signal-to-noise ratio according to the embodiments is used, the amount of delay needed to remove a signal component at a specific frequency band and pass only a noise component through is expressed by the following equation.

$$P(f) = [1 - 4\gamma(1-\gamma)\sin^2(\pi f \Delta \tau)]|F(f)|^2 + R(f) \quad \text{[Equation 1]}$$

Here, "γ" denotes a relative optical intensity transfer ratio of orthogonal polarization components, controlled in the polarization controller, "Δτ" denotes the amount of optical delay of one of the orthogonal polarization components, "F" denotes the Fourier transform spectrum of a signal pulse, "R" denotes the measured intensity of noise, and "f" denotes the specific frequency.

In detail, when γ is 0.5, a frequency minimizing the intensity of the optical signal is 1/(2Δτ). For example, if the amount of delay is set to 62.5 ps in a band of 8 GHz, it allows only the noise component to pass therethrough, thereby making it possible to measure the intensity of the noise.

Figure 4:
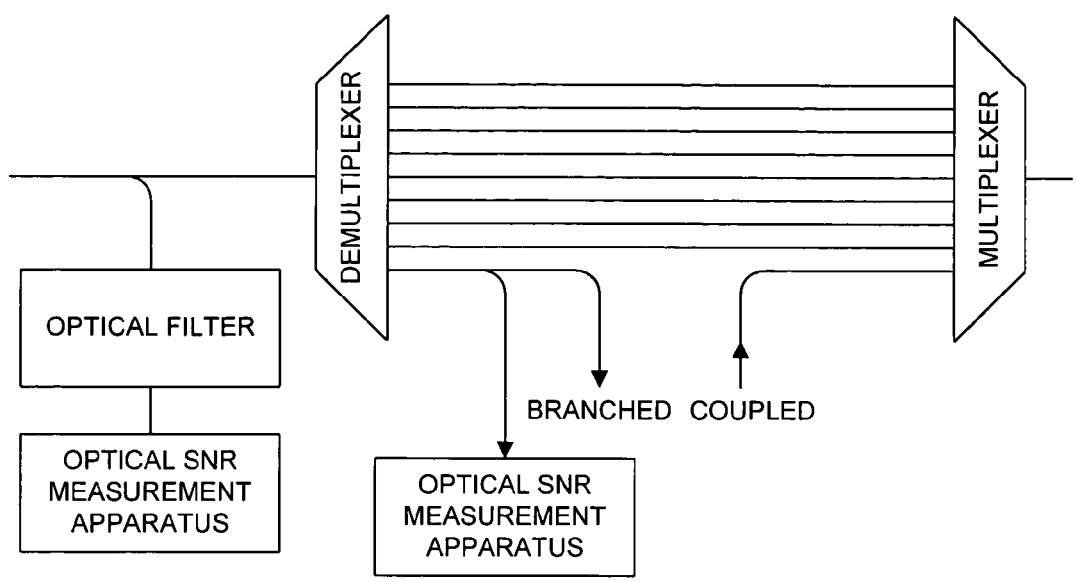
FIG. 4 shows an example of a WDM optical network system to which the apparatus for monitoring the optical signal-to-noise ratio according to the embodiments of FIG. 2 or 3 is applied.

FIG. 4 shows an example of a WDM optical network system to which an apparatus for monitoring an optical signal-to-noise ratio according to the embodiments of FIG. 2 or 3 is applied.

As shown in this figure, in the case where an optical signal-to-noise ratio is measured in an optical line through which a multiplexed optical signal travels, an optical filter is adopted to be connected to the optical line, and the apparatus for monitoring the optical signal-to-noise ratio according to the present invention is connected to the adopted optical filter in order to measure the optical signal-to-noise ratio of optical signals filtered on a channel-by-channel basis. On the other hand, in the case where the optical signal-to-noise ratio is measured in an optical line branched from a demultiplexer, the apparatus for monitoring the optical signal-to-noise ratio is directly connected to the branched optical line in order to measure the optical signal-to-noise ratio.

Figure 5:
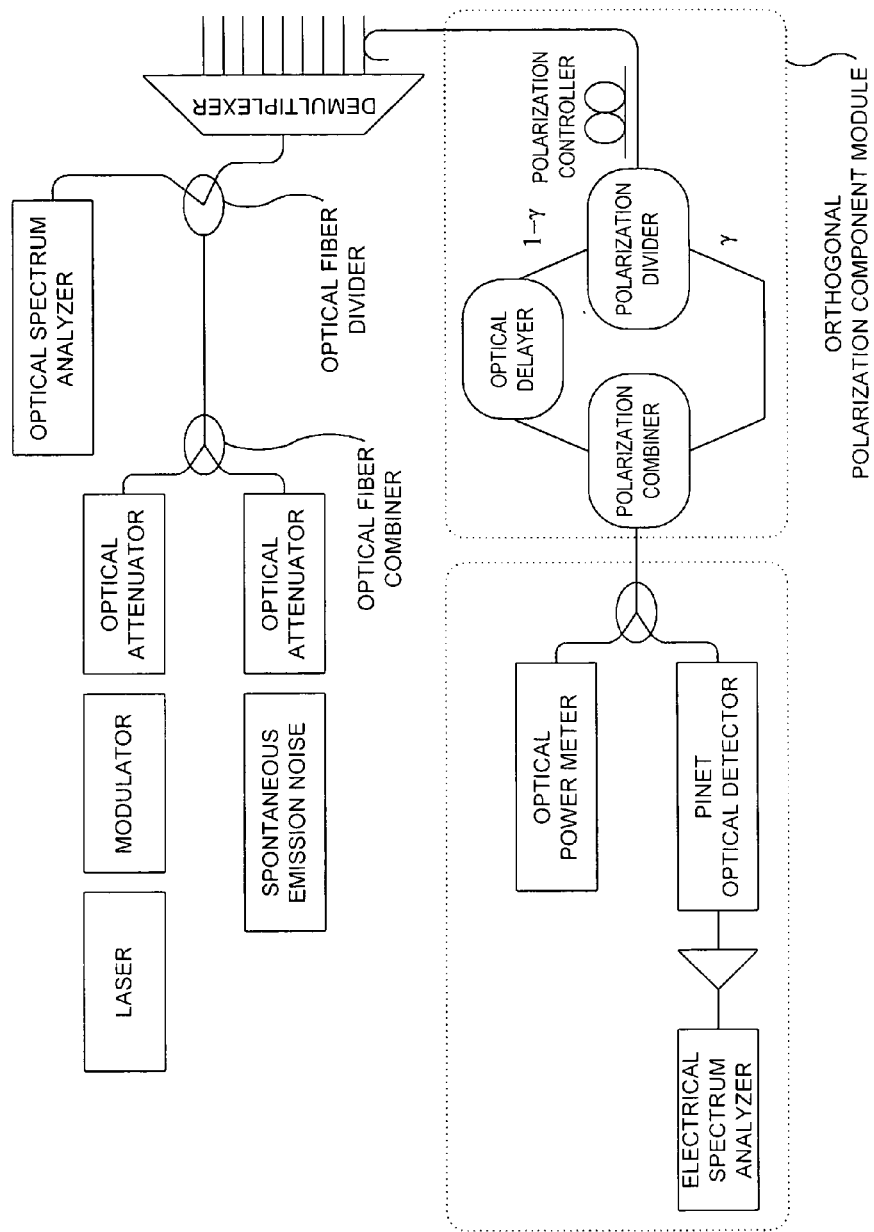
FIG. 5 shows the configuration of an experimental apparatus for demonstrating the operation principle of the apparatus for monitoring the optical signal-to-noise ratio according to the present invention.

FIG. 5 shows the configuration of an experimental apparatus for measuring the relationship of an optical signal-to-noise ratio to the optical signal and noise intensities, when employing the apparatus for monitoring the optical signal-to-noise ratio according to the present invention.

As shown in FIG. 5, in this experimental apparatus, after amplified spontaneous emission noise and an optical signal, modulated by their respective modulators, pass through a variable optical attenuator, they are combined into a single optical signal through an optical fiber combiner. The combined signal is divided into two signals in two different directions through an optical fiber divider. The two divided signals are inputted to an optical spectrum analyzer and a demultiplexer, respectively. Next, the optical signal passing through the demultiplexer is inputted to an orthogonal polarization component module in the apparatus for monitoring the optical signal-to-noise ratio according to the present invention. An optical power meter for measuring the average optical signal intensity and a PINFET optical detector for measuring the noise intensity are connected to the orthogonal polarization component module. An electrical spectrum analyzer is connected to the PINFET optical detector to measure the noise intensity.

Figure 6:
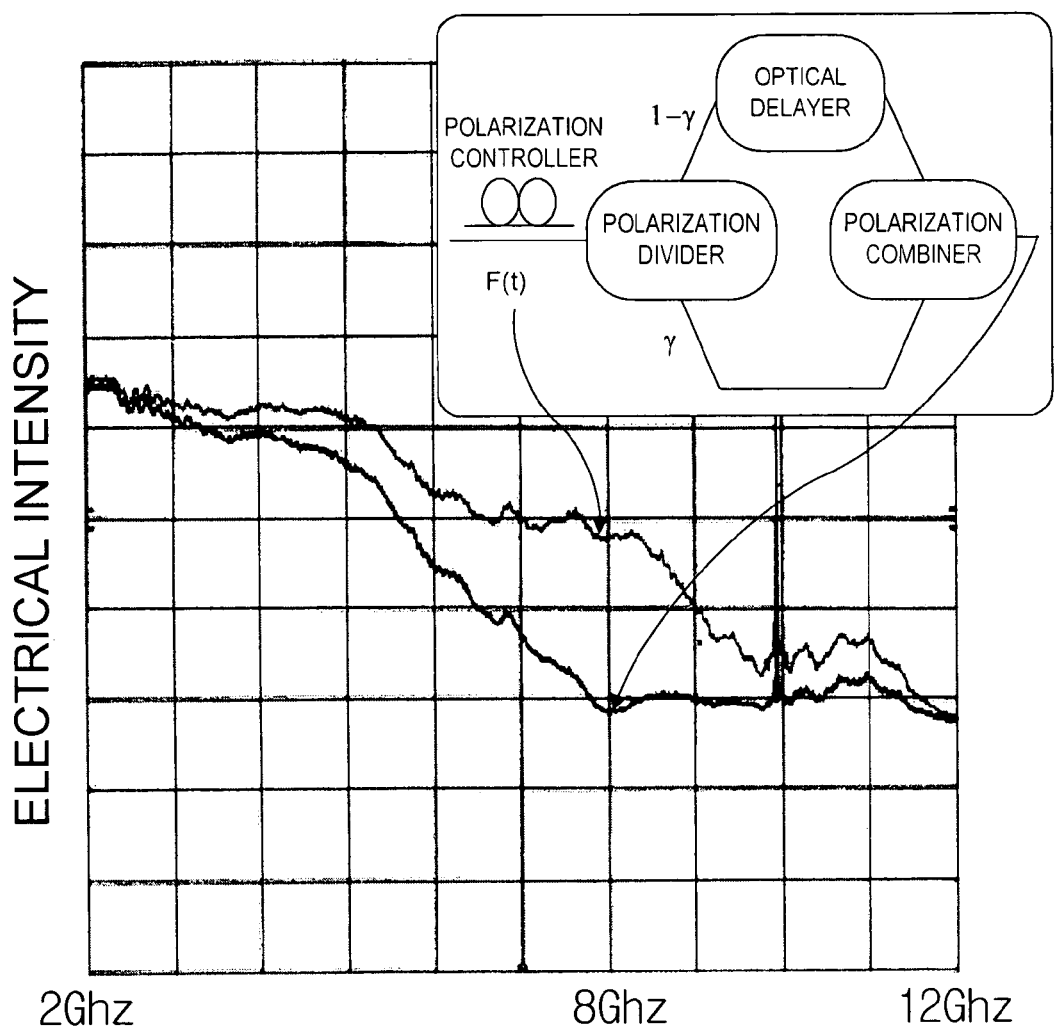
FIG. 6 is a graph showing the change of an electrical signal spectrum measured by using the experimental apparatus shown in FIG. 5.

FIG. 6 is a graph showing the change of an optical signal spectrum measured by using the experimental apparatus shown in FIG. 5.

It can be seen from FIG. 6 that the optical signal intensity is minimized at a band of 8 GHz, when said relative optical intensity transfer ratio γ of orthogonal polarization components controlled in the polarization controller is 0.5 and said amount of optical delay Δτ of one of the orthogonal polarization components is 62.5 ps. This means that the calculation result obtained by Equation 1 coincides with the measurement result obtained by directly using the experimental apparatus.

Figure 7:
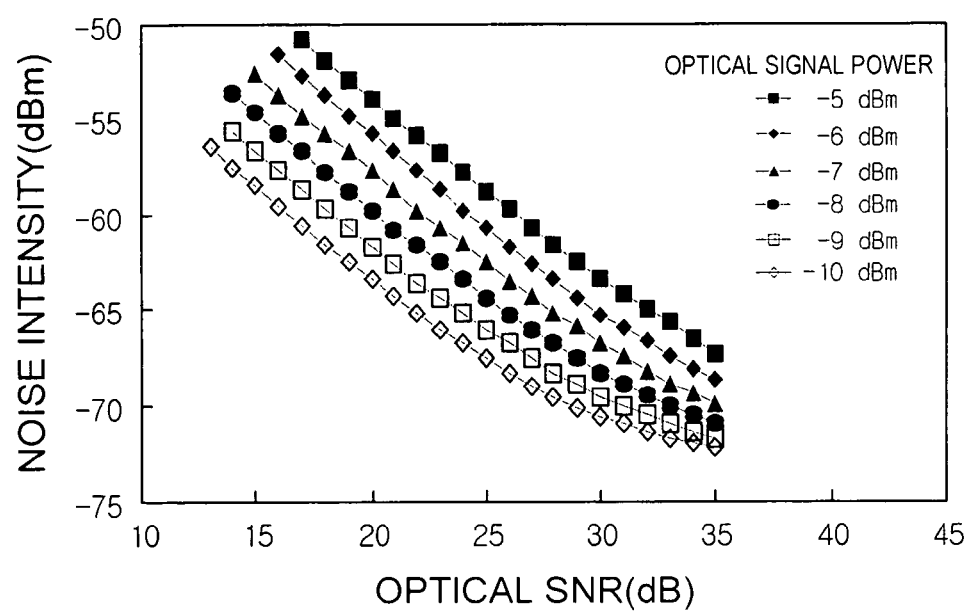
FIG. 7 shows the intensity of noise measured at a band of 8 GHz through the experimental apparatus shown in FIG. 5, as the intensity of an average optical signal and the optical signal-to-noise ratio vary, after the electrical signal intensity is controlled to be minimized at a band of 8 GHz through the orthogonal polarization component module.

FIG. 7 shows the intensity of noise measured through the experimental apparatus shown in FIG. 5. This noise measurement is performed as the input optical power of PINFET optical detector varies from −5 dBm to −10 dBm and the optical signal-to-noise ratio varies from 12 dB to 35 dB, after the electrical signal intensity is controlled to be minimized at a band of 8 GHz through the orthogonal polarization component module.

The measured noise intensity may be classified into beat noise, shot noise, thermal noise, circuit noise, etc. The beat noise varies depending on the optical signal-to-noise ratio, but the shot, heat and circuit noise are not affected by the variance of the optical signal-to-noise ratio. Accordingly, as the average optical power is smaller and the optical signal-to-noise ratio is larger, noise other than beat noise becomes a main noise source, so that the measured noise intensity is not reduced any more. But, in general most case, as the average optical power is larger and the optical signal-to-noise ratio is smaller, the beat noise becomes predominant, increasing the measured noise intensity. It is thus possible to infer the optical signal-to-noise ratio, based on both the measured average optical power and the measured noise intensity shown in FIG. 7.

Figure 8:
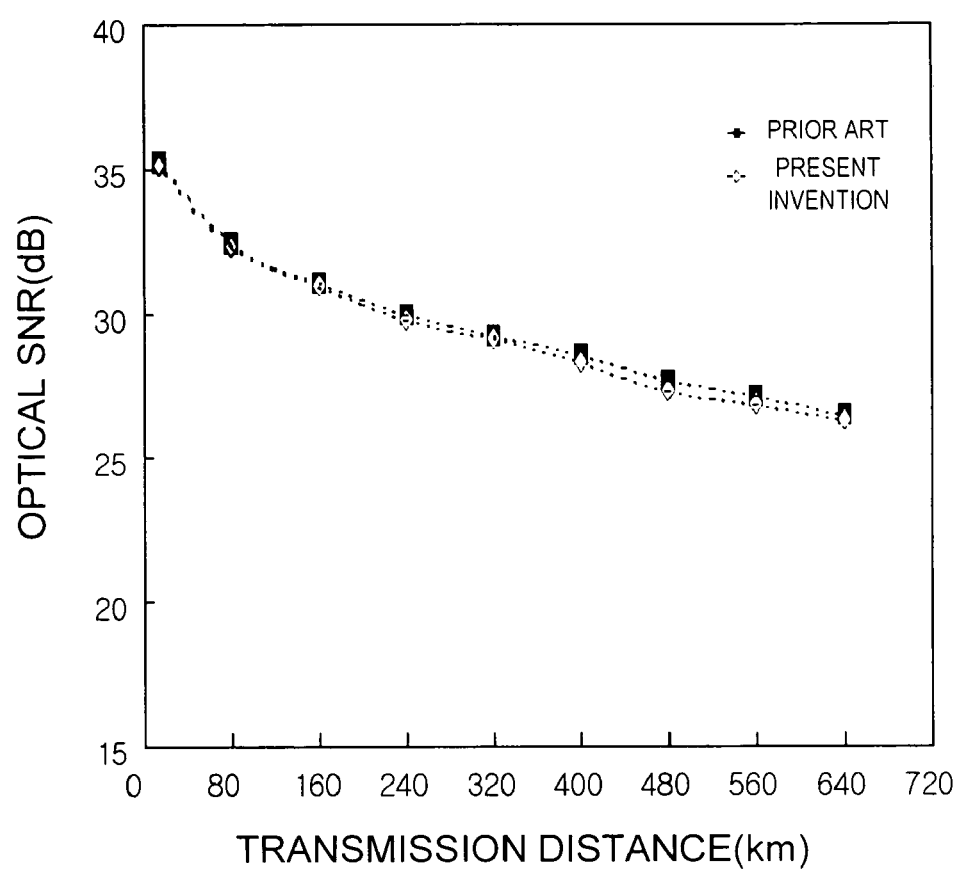
FIG. 8 is a graph showing two measurement result curves of optical signal-to-noise ratio on the basis of the transmission distance of an optical fiber, said curves being obtained by using an apparatus for monitoring an optical signal-to-noise ratio according to the present invention and an optical spectrum analyzer in the prior art, respectively.

FIG. 8 is a graph showing two measurement result curves of optical signal-to-noise ratio, measured on the basis of optical fiber transmission distance, one curve being obtained by using an apparatus for monitoring an optical signal-to-noise ratio according to the present invention and the other curve an optical spectrum analyzer in the prior art.

The amount of optical delay to be made through the orthogonal polarization component module, when an optical signal is transmitted through an optical fiber, may differ from the amount of optical delay before the transmission is performed, due to polarization mode dispersion in the optical fiber. One of the two measurement result curves of optical signal-to-noise ratio in FIG. 8, measured by using an apparatus for monitoring the optical signal-to-noise ratio according to the embodiments of the present invention, is obtained by measuring the intensity of noise when the optical signal intensity is controlled to be minimized at a frequency band of 8 GHz at which the intensity of noise is to be measured, while the amount of optical delay is set to 62.5 ps ± several ps in order to suppress the influence of the polarization mode dispersion of the optical fiber.

As shown in FIG. 8, the optical signal-to-noise ratio was measured with an error of ±0.5 dB, through the apparatus for monitoring the optical signal-to-noise ratio according to the present invention. Accordingly, by simply controlling the amount of optical delay, it is possible to measure the optical signal-to-noise ratio even after the demultiplexing is performed unlike optical spectrum analyzer.

Figure 9:
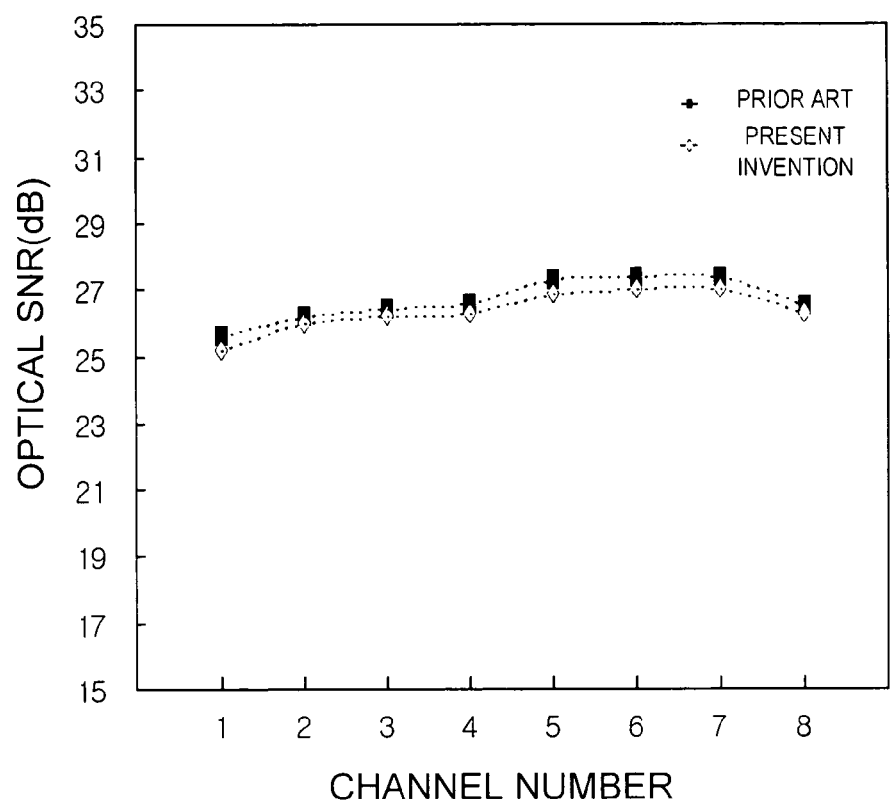
FIG. 9 is a graph showing two measurement result curves of optical signal-to-noise ratio on a channel-by-channel basis after the transmission is made through a single mode optical fiber having a length of 640 km, said curves being obtained by using an apparatus for monitoring an optical signal-to-noise ratio according to the present invention and an optical spectrum analyzer in the prior art, respectively.

FIG. 9 is a graph showing two measurement result curves of optical signal-to-noise ratio, measured on a channel-by-channel basis after the transmission has been made through a single mode optical fiber having a length of 640 km, one curve being obtained by using an apparatus for monitoring an optical signal-to-noise ratio according to the present invention and the other curve an optical spectrum analyzer in the prior art.

As shown in FIG. 9, when using the apparatus for monitoring the optical signal-to-noise ratio according to the present invention, the optical signal-to-noise ratio was measured with an error of ±0.5 dB, irrespective of the channel, even after the transmission has been made through the 640 km-long single mode optical fiber. It is thus understood that the present invention is not affected by optical wavelength.

As apparent from the above description, an apparatus for monitoring an optical signal-to-noise ratio according to the present invention has the following advantages. First, by removing a signal component in a specific frequency bandwidth and passing only a noise component through, it is possible to easily measure the intensity of noise within a signal bandwidth that cannot be measured in general.

When using the conventional apparatus for monitoring an optical signal-to-noise ratio, the pattern length of a signal is restricted and the noise spectrum must be flat. However, when using the apparatus for monitoring the optical signal-to-noise ratio according to the present invention, it is possible to measure the optical signal-to-noise ratio even for a signal whose amplified spontaneous emission noise spectrum is not flat, irrespective of the signal pattern length since the present invention can measure the noise intensity within signal bandwidth.

Consequently, it is possible to effectively perform the operation, maintenance and management of a WDM optical network.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for monitoring an optical signal-to-noise ratio, comprising:

an orthogonal polarization component module for receiving an optical signal and outputting it after removing a signal component thereof at a specific frequency band; and calculation means for measuring both average optical intensity and electrical noise component intensity of the optical signal outputted from the orthogonal polarization component module, wherein the orthogonal polarization component module includes:

a polarization controller for receiving the optical signal and outputting it while controlling first and second polarization components of the optical signal perpendicular to each other to have the same intensity;

a polarization divider for receiving the optical signal outputted from the polarization controller, and dividing it into the first and second polarization components, and then outputting them;

an optical delay element for receiving one of the first and second polarization components outputted from the polarization divider, and delaying and outputting the received polarization component; and a polarization combiner for receiving the two polarization components outputted from the polarization divider, one being delayed by the optical delay element and the other not delayed, and combining them into an optical signal and outputting the optical signal.

2. The apparatus according to claim 1, wherein the amount of delay to be made through the optical delay element is calculated by the following equation:

$$f=1/(2\Delta\tau),$$

where "f" denotes the specific frequency and "Δt" denotes the amount of optical delay.

3. The apparatus according to claim 1, wherein the calculation means includes:
an optical divider for dividing the optical signal outputted from the orthogonal polarization component module into two optical signals in two different directions;
average signal intensity measurement means for measuring a average signal intensity of one of the two optical signals outputted from the optical divider;
noise intensity measurement means for measuring a noise intensity of the other one of the two optical signals outputted from the optical divider; and
a calculator for calculating an optical signal-to-noise ratio based on both the measured average signal intensity and the measured noise intensity.

4. The apparatus according to claim 3, wherein the average signal intensity measurement means includes:
a first optical detector for receiving said one of the two optical signals outputted from the optical divider and converting it into a first electrical signal, and outputting the first electrical signal; and
a DC amplifier for amplifying a DC component of the first electrical signal outputted from the first optical detector.

5. The apparatus according to claim 3, wherein the noise intensity measurement means includes:
a second optical detector for receiving said other one of the two optical signals outputted from the optical divider, and converting it into a second electrical signal and outputting the second electrical signal;
an AC amplifier for amplifying an AC component of the second electrical signal outputted from the second optical detector, and then outputting the amplified AC component;
an electrical band pass filter for extracting a noise component from the AC component amplified by the AC amplifier, and outputting the extracted noise component; and
an electrical intensity meter for measuring an intensity of the noise component outputted from the electrical band pass filter.

6. The apparatus according to claim 1, wherein the calculation means includes:
an optical detector for receiving the optical signal outputted from the orthogonal polarization component module and converting it into an electrical signal, and outputting the electrical signal;
an electrical intensity divider for dividing the electrical signal outputted from the optical detector into two electrical signals to be outputted in two different directions;
average signal intensity measurement means for receiving one of the two electrical signals outputted from the electrical intensity divider, and measuring an average signal intensity of the optical signal;
noise intensity measurement means for receiving the other one of the two electrical signals outputted from the electrical intensity divider, and measuring a noise component intensity; and
a calculator for calculating an optical signal-to-noise ratio based on both the measured average signal intensity and the measured noise component intensity.

7. The apparatus according to claim 6, wherein the average signal intensity measurement means includes a DC amplifier for amplifying a DC component of said one of the two electrical signals outputted from the electrical intensity divider,
the noise intensity measurement means includes:
an AC amplifier for amplifying an AC component of said other one of the two electrical signals outputted from the electrical intensity divider;
an electrical band pass filter for extracting a noise component from the AC component amplified by the AC amplifier; and
an electrical intensity meter for measuring an intensity of the noise component outputted from the electrical band pass filter.

8. The apparatus according to claim 1, wherein the optical delay element is tunable.

* * * * *